(12) United States Patent
Brostedt et al.

(10) Patent No.: US 12,616,159 B2
(45) Date of Patent: May 5, 2026

(54) MILKING SYSTEM

(71) Applicant: DELAVAL HOLDING AB, Tumba (SE)

(72) Inventors: Gunnar Brostedt, Tumba (SE); Andreas Edmark, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 18/701,198

(22) PCT Filed: Oct. 12, 2022

(86) PCT No.: PCT/SE2022/050921
§ 371 (c)(1),
(2) Date: Apr. 12, 2024

(87) PCT Pub. No.: WO2023/063866
PCT Pub. Date: Apr. 20, 2023

(65) Prior Publication Data
US 2025/0000047 A1 Jan. 2, 2025

(30) Foreign Application Priority Data
Oct. 14, 2021 (SE) .................................... 2151262-9

(51) Int. Cl.
*A01J 5/007* (2006.01)
*A01J 5/04* (2006.01)
(52) U.S. Cl.
CPC ............... *A01J 5/047* (2013.01); *A01J 5/007* (2013.01)
(58) Field of Classification Search
CPC ............. A01J 5/047; A01J 5/007; A01J 5/048
See application file for complete search history.

(56) References Cited

U.S. PATENT DOCUMENTS 3,783,837 A * 1/1974 Olander ................... A01J 5/007
119/14.08
5,613,514 A 3/1997 Tan et al.
(Continued)

FOREIGN PATENT DOCUMENTS

CN 109640637 A 4/2019
CN 210739513 U 6/2020
(Continued)

OTHER PUBLICATIONS

Meier, Hans-Dieter, Translation Method And Device For Improving Milking Vacuum Near A Teat Of An Animal To Be Milked, May 21, 2003 (Year: 2003).*

(Continued)

*Primary Examiner* — Joshua D Huson
*Assistant Examiner* — Alanna K Peterson
(74) *Attorney, Agent, or Firm* — NIXON & VANDERHYE

(57) ABSTRACT

A milking system, including: a vacuum pump, a receiver, a milk line, and a plurality of milking units. Each milking unit is connected to the milk line via a respective milk conduit. Each milking unit is also associated with a respective valve arrangement, arranged in the milk conduit, wherein the valve arrangement includes an adjustable passage for adjustment of the fluid pressure. The system also includes a pressure sensor, arranged to measure fluid pressure in the milk conduit upstream the valve arrangement; and a controller. The controller is configured to obtain a pressure level measurement from the pressure sensor and generate and provide a control signal to the valve arrangement, to adjust the adjustable passage, based on the pressure level measurement.

13 Claims, 7 Drawing Sheets

(56)                  References Cited

U.S. PATENT DOCUMENTS

| | | | |
|---|---|---|---|
| 5,860,388 | A | 1/1999 | Tan et al. |
| 2007/0215053 | A1 | 9/2007 | Duke |
| 2012/0312237 | A1* | 12/2012 | Hansen .................... A01J 5/007 |
| | | | 119/14.08 |
| 2017/0303497 | A1* | 10/2017 | Fematt .................... A01J 5/044 |
| 2018/0007860 | A1* | 1/2018 | Linlor .................... A01J 5/048 |
| 2018/0020633 | A1* | 1/2018 | Gehm ........................ A01J 5/14 |
| | | | 119/14.02 |
| 2018/0246005 | A1 | 8/2018 | Enickl |
| 2018/0359984 | A1 | 12/2018 | Walvoort et al. |
| 2019/0191657 | A1 | 6/2019 | Enickl |
| 2020/0084994 | A1 | 3/2020 | Mostert et al. |
| 2020/0396953 | A1 | 12/2020 | Paulrud |
| 2021/0345577 | A1 | 11/2021 | Paulrud |

FOREIGN PATENT DOCUMENTS

| | | |
|---|---|---|
| CN | 111683524 A | 9/2020 |
| CN | 112423582 A | 2/2021 |
| EP | 1312256 A2 | 5/2003 |
| KR | 102015026 B1 | 9/2019 |
| WO | WO-2007089185 A1 * | 8/2007 .............. A01J 5/048 |
| WO | 2008095552 A1 | 8/2008 |
| WO | 2009093966 A2 | 7/2009 |
| WO | WO-2013089632 A1 * | 6/2013 .............. A01J 5/007 |
| WO | 2013137717 A1 | 9/2013 |
| WO | WO-2016122308 A2 * | 8/2016 .............. A01J 5/007 |
| WO | 2018044224 A1 | 3/2018 |
| WO | WO-2020021521 A1 * | 1/2020 .............. A01J 5/007 |

OTHER PUBLICATIONS

International Search Report for PCT/SE2022/050921 mailed Jan. 3, 2023, 2 pages.

Written Opinion of the ISA for PCT/SE2022/050921 mailed Jan. 3, 2023, 10 pages.

Swedish Search Report for SE2151262-9 mailed May 13, 2022, 3 pages.

Li, Jianguo, editor. Modern Dairy Cattle Production [Xiandai Nainiu Shengchan]. China Agricultural University Press, 2007, pp. 342-343.

Office Action, issued in Chinese Patent Application No. 202280057366.5 dated Dec. 10, 2025.

* cited by examiner

MILKING SYSTEM

CROSS-REFERENCE TO RELATED APPLICATIONS

This application is the US national stage of PCT/SE2022/050921, filed Oct. 12, 2022 and designating the United States, which claims the priority of SE 2151262-9, filed Oct. 14, 2021. The entire contents of each foregoing application are incorporated herein by reference.

BACKGROUND OF THE INVENTION

Field of the Invention

The invention relates to a milking system.

Description of the Related Art

On a dairy farm, milk is typically extracted from the animals by attaching a teat cup with a liner on each teat of the animal and apply milking vacuum under the tip of the teat, in addition to a pulsation vacuum. Hereby, the rhythmical suckling of a calf is imitated so that sucking by the milking vacuum is interrupted by rhythmical motions, opening and closing of the liner, caused by the pulsation vacuum.

It has been noted that the fluid pressure level under each teat end is varying with the actual milk flow of the respective teat. The amplitude of the variation depends e.g. on the type and installation methodologies of tubes and other milking system components. Another reason for the resulting variations in fluid pressure under the teat is that the system vacuum level may vary during the milking session.

Too low and/or unstable fluid pressure level under the teat end slows down the milking, leading to low/decreased throughput of animals at the farm. In case the milking vacuum level would be increased to overcome this problem, the teats may be hurt.

Another problem sometimes occurring during milking is that the animal may move the legs/body in a way causing one or several teat cups to slip off the teat. In case the teat cup falls to the farm floor, dirt and other non-desired particles may be absorbed into the teat cup and forwarded to the common milk line, thus contaminating the milk of the receiver, which may cause a considerable volume of milk to be wasted.

SUMMARY OF THE INVENTION

It is an object of the present invention to evolve a concept for improved milk extraction in terms of time and efficiency, while ensuring and/or enhancing satisfying teat integrity.

This object is achieved by a milking system according to claim 1. The inventive milking system aims at adjusting fluid pressure of a milking unit, via a controllable valve arrangement depending on a measured fluid pressure in the milk conduit of the milking unit, indicative of the fluid pressure in the teat cups, under the animal teats.

The milking system comprises various components, such as for example one or several vacuum pumps, configured to generate a system vacuum pressure. The milking system also comprises a receiver, connected to the vacuum pump. The milking system also comprises a common milk line connected to the receiver.

The milking system in addition comprises a milking unit comprising at least one teat cup. The teat cup/each teat cup is configured to fit on a respective teat of the animal during milk extraction in a milking session, wherein the milking unit is connected to the common milk line via a milk conduit. Each teat cup comprises a respective liner and a shell, forming a pulsation space between the liner and the shell.

Each of the milking units is associated with a controllable valve arrangement, arranged in the milk conduit between the milking unit in question, and the common milk line, wherein the controllable valve arrangement comprises an adjustable passage. The fluid pressure of the common milk line is provided to the milk conduit via the adjustable passage. An adjustment of the adjustable passage results in an adjustment of the fluid pressure in the milking unit and in a section of the milk conduit between the milking unit and the controllable valve arrangement upstream of the controllable valve arrangement in a liquid flow path.

The expression "upstream" in the current context refers to the liquid/milk flow direction during milk extraction in the milking session, from the teat cups, via the milk conduit to the common milk line and the receiver.

The milking system also comprises a pressure sensor, arranged to measure fluid pressure in the milk conduit upstream the controllable valve arrangement, between the milking unit and the controllable valve arrangement.

The fluid pressure may thereby be determined in relatively close vicinity of the milking unit, thereby representative of the fluid pressure that the animal teats are exposed for.

In addition, the milking system furthermore comprises a controller communicatively connected to the pressure sensor and to the controllable valve arrangement. The controller is configured to, repeatedly during the milking session, obtain a pressure level measurement from the pressure sensor; and generate and provide a control signal to the controllable valve arrangement, to adjust the adjustable passage, based on the obtained pressure level measurement.

By providing a milk conduit, pressure sensor and controllable valve arrangement for each of the teat cups, the fluid pressure under each of the animal teats could be continuously monitored during the milking session. The fluid pressure may be adjusted individually for each of the teats, according to a teat specific milk flow rate (milk flow per time unit), for example. An optimized or at least improved milking process is achieved.

The controller is controlling an adjustable passage of the controllable valve arrangement located in the milk conduit. By measuring the fluid pressure level in the milk conduit and thereafter, based on the fluid pressure measurement, adjust the controllable valve arrangement, the fluid pressure level in the milk conduit and under the teat end can be correspondingly adjusted and kept stable even though both the milk flow rate and the system vacuum level may be varying. An efficient yet teat integrity friendly milk extraction is achieved.

A convenient yet reliable and robust adjustment of the fluid pressure applied to the milk conduit, and thereby also the fluid pressure applied on the teats in the teat cups is achieved. The fluid pressure upstream the valve arrangement, in the milk conduit could thus be measured by the vacuum pressure sensor and a control may be made, for example, whether a desired fluid pressure of the milk conduit has been achieved.

Yet an advantage by the provided solution is that a milk flow meter in the milk conduit (which sometimes is used in prior art solutions for regulating the applied vacuum level)

becomes superfluous and could be omitted, which saves total costs of the milking system as less hardware/maintenance is involved.

The milking unit may comprise a plurality of teat cups and a claw in some embodiments. The claw may be connected to each of the teat cups; and the milk conduit may be connected to the claw and the common milk line.

Measurements of the fluid pressure in the milk conduit, representative of the vacuum level under the teats, also assure that the animal teats are not exposed for a too intensive vacuum pressure.

Each milking point of the milking system may comprise a plurality of milking units, for example when quarter milking is applied and each milking unit comprises one teat cup that is associated with a milk conduit. The milking units that are applied to the same animal may then be associated with a common milking point.

The controller may be configured to generate and provide the control signal to the controllable valve arrangement in order to maintain the fluid pressure upstream of the controllable valve arrangement in the liquid flow path substantially constant during the milking session.

Thus, a desired constant fluid pressure may be applied to the teats, independently of variations in milk flow, leading to an efficient, yet teat integrity friendly milk evacuation.

Also, or alternatively, the controller may be configured to generate and provide the control signal to the controllable valve arrangement in order to maintain the fluid pressure upstream of the controllable valve arrangement in the liquid flow path at a plurality of fluid pressure levels during the milking session, based on the obtained pressure level measurements.

When the milk flow rate of the animal/teat is low, a low fluid pressure may be applied, and when the milk flow rate is high, a high fluid pressure may be applied. Hereby, the teats are protected from excessive fluid pressure when the milk flow rate is low, while milk is efficiently extracted when the milk flow rate is high by applying a high fluid pressure.

The controller may be configured to obtain an identity reference of the animal situated in the milking point, before or at the beginning of the milking session. Also, the controller may obtain a vacuum profile of the animal, based on the obtained identity reference. The generate and provide control signal to the controllable controller may in addition valve arrangement in order to follow the obtained vacuum profile during the milking session of the animal.

The applied fluid pressure may thus be adapted to the individual animal on an udder level, or a teat level of the animal, for example based on a previously stored milk flow rate of the animal on an udder level or teat level during the milking session, leading to a more efficient milk extraction.

The pressure sensor may be arranged in a section of the milk conduit in close vicinity of the milking unit, but not integrated in the milking unit.

The pressure sensor of the milking system may in some embodiments be arranged in a passage of the milk conduit having substantially the same diameter as the milk conduit.

An advantage thereby is that pressure drop over the pressure sensor is avoided or at least reduced.

The controllable valve arrangement of the milking system may comprise an actuator arranged to receive the control signal from the controller and adjust the adjustable passage of the milk conduit, based on the received control signal.

The controller may thereby, based on the pressure level measurements obtained from the pressure sensor, adjust the adjustable passage of the milk conduit in an efficient manner.

The controllable valve arrangement may comprise a wet section and a dry section, separated by a flexible membrane, wherein the milk conduit passes the wet section. The flexible membrane is configured to close the adjustable passage of the milk conduit when atmospheric air pressure is provided to the dry section and to open the adjustable passage when a control vacuum at a large under-pressure is provided to the dry section. The actuator may comprise a solenoid regulator block which generates the control vacuum provided to the dry section.

The adjustable passage may take any position between fully opened and completely closed depending on the pressure level of the control vacuum.

The solenoid may be arranged to receive the control signal from the controller. Based on the received control signal, the solenoid may generate the control vacuum by adjusting an amount of atmospheric air pressure mixed with the system vacuum. The level of the control vacuum provided to the dry section of the valve is thereby adjusted. The position of the flexible membrane is correspondingly adjusted according to the control vacuum. The adjustable passage is thereby adjusted according to the provided control vacuum.

An efficient yet reliable control of the fluid pressure upstream the valve is thereby provided.

The controllable valve arrangement may in some embodiments comprise a moveable magnetic male part arranged inside the milk conduit, wherein the moveable magnetic male part is arranged to interact with a non-moveable female part in the milk conduit. A longitudinal distance between the moveable magnetic male part and the non-moveable female part forms the adjustable passage, which adjustable passage is adjusted by altering a longitudinal position of the moveable magnetic male part in relation to the non-moveable female part. The actuator may be arranged to receive the electrical control signal from the controller and, based on the received electrical control signal, adjust position of a magnetic segment of the actuator acting on the moveable magnetic male part, thereby altering the longitudinal position of the moveable magnetic male part, which position adjusts the adjustable passage.

Thanks to the magnetic control of the adjustable passage via the magnetic segment of the actuator, control of the adjustable passage is enabled, without impact or disturbance on the milk conduit or requiring a flexible membrane. Extended technical lifetime of both the milk conduit and the controllable valve arrangement is achieved.

The controller may additionally be configured to, repeatedly during the milking session, compare the obtained pressure level measurement with a previously obtained pressure level measurement. When a difference between the obtained pressure level measurement and the previously obtained pressure level measurement exceeds a kick-off detection pressure difference, the controller may generate and provide a control signal to the controllable valve arrangement to close the adjustable passage.

Hereby, the controller is enabled to detect whether any milking unit has slipped/been kicked off the respective teat, very fast (i.e. within fragments of a second, depending on the frequency of the pressure measurements) by monitoring the fluid pressure level and check for a fast vacuum drop. This enables a rapid shut off after kick off which improves food safety.

The milking system may comprise, or be implemented in a milking parlor such as a conventional stationary milking parlor or a stanchion milking parlor. In other embodiments, the milking system may comprise, or be implemented in a rotary platform.

One particular controller may be dedicated for each particular milking unit, or milking point, in some embodiments.

By this arrangement, an instant control of the adjustable passage of the milk conduit and thereby also the fluid pressure upstream the controllable valve arrangement may be made.

Other advantages and additional novel features will become apparent from the subsequent detailed description.

BRIEF DESCRIPTION OF THE DRAWINGS

Embodiments of the invention will now be described in further detail with reference to the accompanying Figures, in which.

DETAILED DESCRIPTION

Embodiments of the invention described herein are defined as a milking system, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
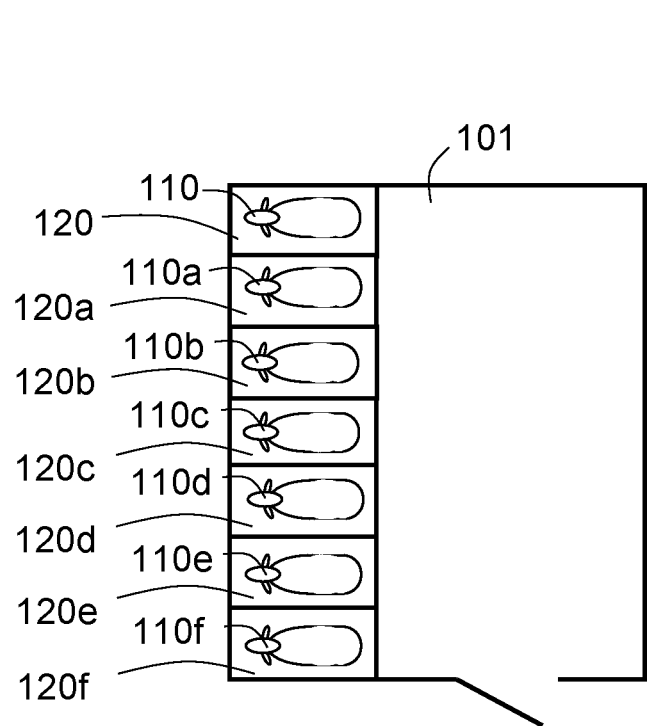
FIG. 1A illustrates an agricultural environment comprising a milking system according to an embodiment.

FIG. 1A illustrates an agricultural environment comprising a milking system 100 comprising a milking parlor 101. The milking parlor 101 comprises a plurality of milking points 120, 120a, 120b, 120c, 120d, 120e, 120f, each configured to house one animal 110, 110a, 110b, 110c, 110d, 110e, 110f at the time during a milking session.

The milking system 100 is configured to extract milk from the animals 110, 110a, 110b, 110c, 110d, 110e, 110f at the milking points 120, 120a, 120b, 120c, 120d, 120e, 120f during the milking session. The animals 110, 110a, 110b, 110c, 110d, 110e, 110f may form part of a herd of animals at a dairy farm.

"Animal" may be any arbitrary type of domesticated female mammal such as e.g. cow, goat, sheep, camel, horse, dairy buffalo, donkey, yak, etc. (non-exhaustive list of animals). The animal may have four teats, as for example cows, or two teats, such as for example goats and/or sheep. Other animals may have other numbers of teats.

Figure 1B:
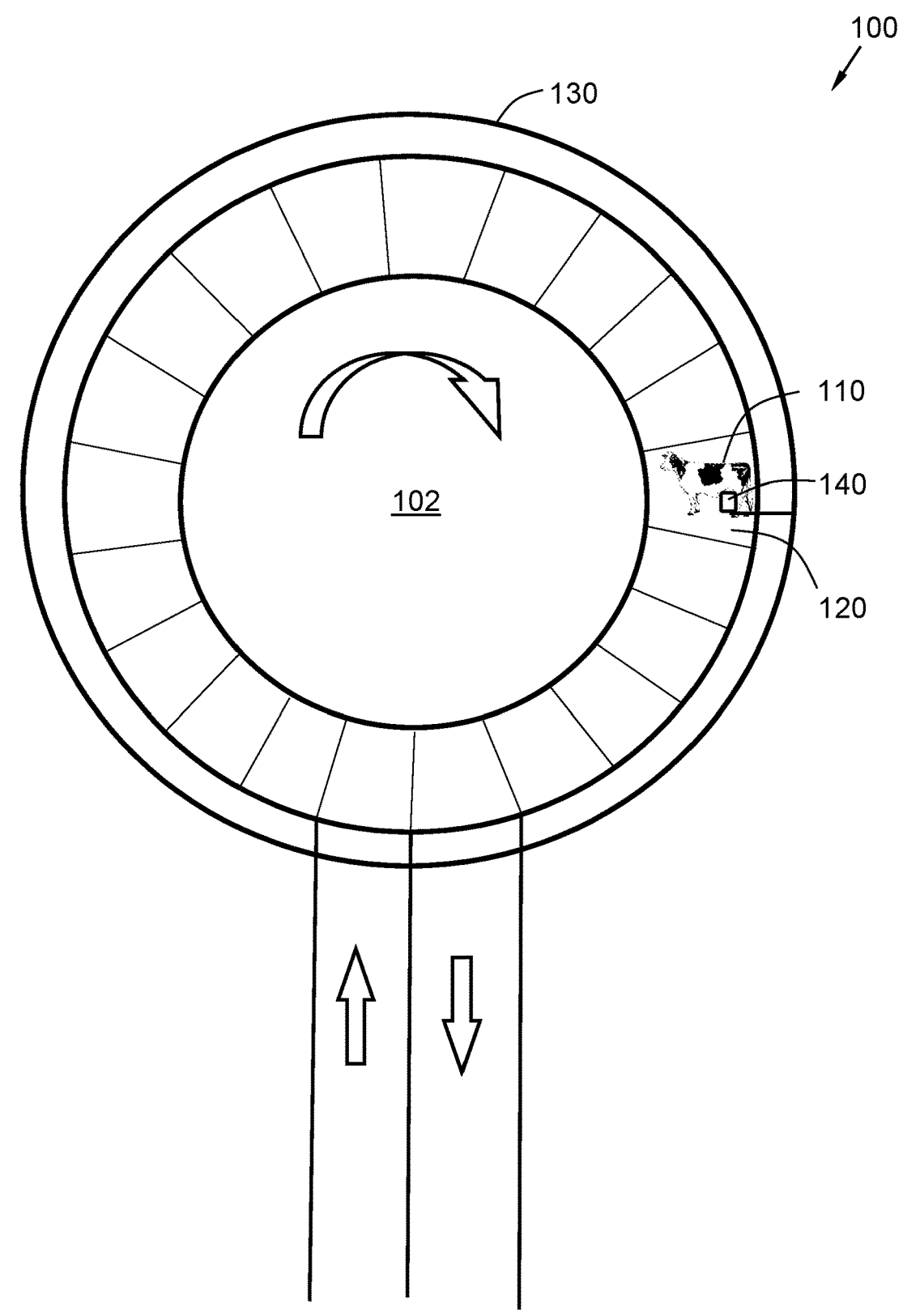
FIG. 1B illustrates an agricultural environment comprising a milking system according to an embodiment.

FIG. 1B illustrates an alternative agricultural environment, a rotary platform 102, in which the milking system 100 may be implemented.

The animals 110, 110a, 110b, 110c, 110d, 110e, 110f are directed to the rotary platform 102 via an entrance path leading the animals 110, 110a, 110b, 110c, 110d, 110e, 110f onto the rotary platform 102. Platform rotation may move the animal 110, 110a, 110b, 110c, 110d, 110e, 110f to a position of an operator. The operator may then perform cleaning of the animal teats and attach the milking unit 140 to the animal udder. After milking, the animal 110, 110a, 110b, 110c, 110d, 110e, 110f exits the rotary platform 102 via an exit path. Animals 110, 110a, 110b, 110c, 110d, 110e, 110f may constantly be entering and exiting the rotary platform 102, via the respective entrance/exit paths. This continuous flow of animals is the main contributor to the high efficiency in terms of animal throughput of the rotary platform concept. Often the rotary platform 102 may rotate at a constant speed.

Rotary platforms 102 are labor efficient and provides a high cow throughput per hour.

The size of the rotary platform 102 may be different in different implementations, but may for example have between about 30-150 stalls, allowing the same number of animals 110, 110a, 110b, 110c, 110d, 110e, 110f to simultaneously be milked on the rotary platform 102. The rotational speed of the rotary platform 102 may be adapted to the estimated time it takes for an animal 110, 110a, 110b, 110c, 110d, 110e, 110f to complete the milking session.

However, the time-efficient milk extraction due to the invention enables an increase of the rotational speed of the rotary platform 102 and thereby also of the throughput of cows per time unit, in relation to previously known methods.

Figure 2A:
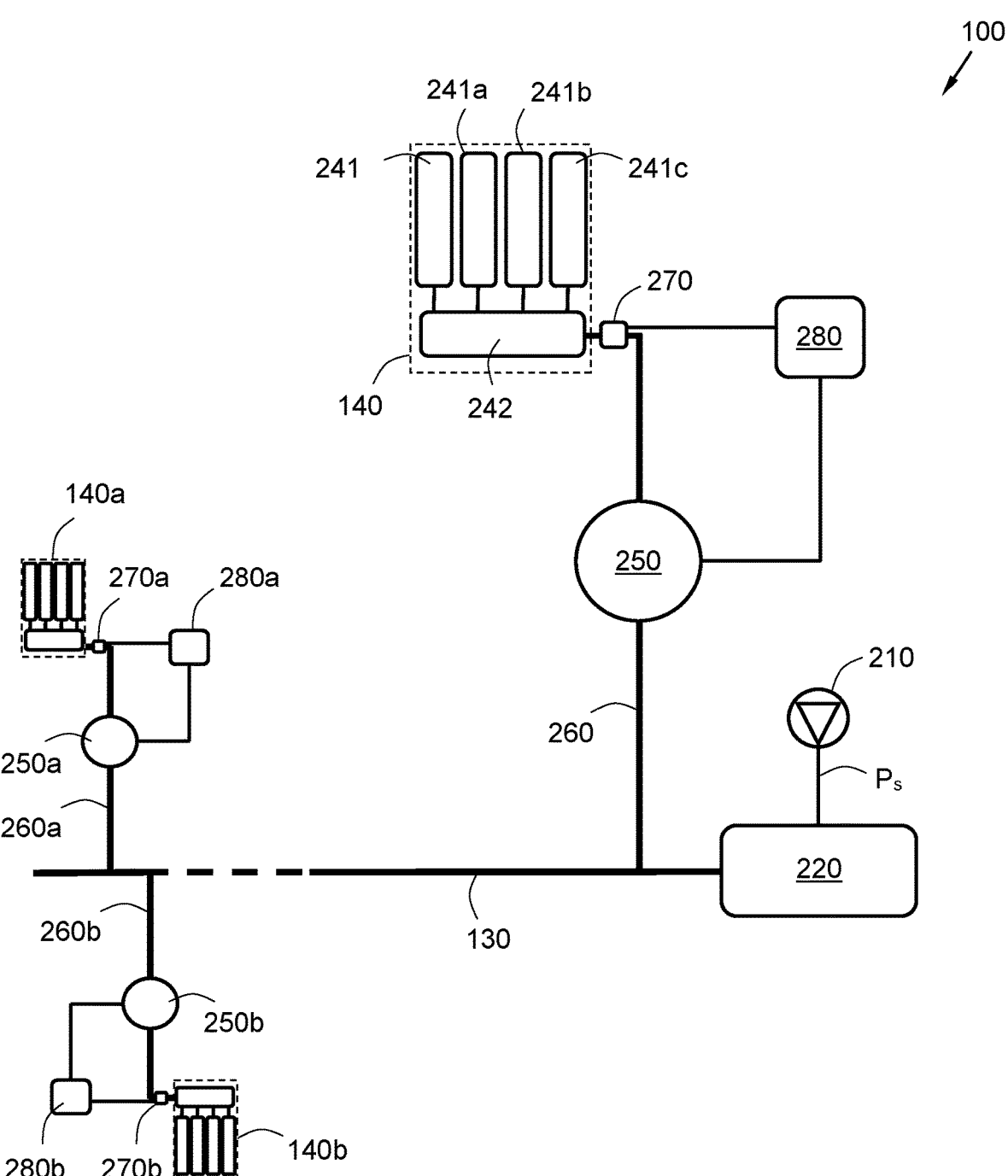
FIG. 2A illustrates a milking system according to an embodiment.

The milking system 100 comprises a plurality of milking units 140, 140a, 140b, as illustrated in FIG. 2A. Each of the milking units 140, 140a, 140b comprises a number of teat cups 241, 241a, 241b, 241c. The number of teat cups 241, 241a, 241b, 241c is typically identical with the number of teats of the animals 110, 110a, 110b, 110c, 110d, 110e, 110f to be milked within the milking system 100. Each teat cup 241, 241a, 241b, 241c is configured to fit on a respective teat of the animal 110, 110a, 110b, 110c, 110d, 110e, 110f and to be attached thereto during milk extraction in the milking session.

Each teat cup 241, 241a, 241b, 241c comprises a respective liner and a shell, forming a pulsation space between the liner and the shell.

Each milking unit 140, 140a, 140b is connected to a common milk line 130, transporting extracted milk from the respective udder, via a respective milk conduit 260, 260a, 260b and the common milk line 130 to a receiver 220. The receiver 220 is in turn connected to a vacuum arrangement, comprising one or several vacuum pumps 210. The vacuum pump/s 210 has generated and/or continuously generates a system vacuum pressure $P_s$ supplied to the receiver 220 and the common milk line 130.

The system vacuum pressure $P_s$ may be for example somewhere between about 45-55 kPa (arbitrary, non-limiting examples), such as for example about 49 kPa. The system vacuum pressure $P_s$ may be maintained substantially constant over time in the receiver 220 during a majority time of the milking session.

The expressions "vacuum pressure", "fluid pressure", "milking vacuum" and/or "system vacuum pressure" respectively, refers to under-pressure/lower pressure in comparison with the environmental atmospheric pressure. A vacuum pressure level of 10 kPa thus means a vacuum pressure level which is 10 kPa lower than the environmental atmospheric pressure.

The receiver 220 may collect milk extracted from the animals during the milking session, which may be forwarded via a pump arrangement, tubing and possibly an optional filter, to a connected cooling tank where the milk may be collected and maintained at chilled temperature until being emptied when the milk truck arrives to the farm.

Each milking unit 140, 140a, 140b of the milking system 100 is also associated with a respective pressure sensor 270, 270a, 270b, or vacuum pressure sensor. The pressure sensor 270, 270a, 270b may be associated with the milk conduit 260, 260a, 260b of the milking unit 140, 140a, 140b and arranged to measure the fluid pressure level in the milk conduit 260, 260a, 260b in relatively close vicinity of the milking unit 140, 140a, 140b. The fluid pressure measured by the pressure sensor 270, 270a, 270b upstream of the controllable valve arrangement 250, 250a, 250b, 250c in a liquid flow path is thereby representative of (although due to possible pressure drop not identical with) the fluid pressure that is prevailing in the teat cups 241, 241a, 241b, 241c under the animal teats.

The pressure sensor 270, 270a, 270b may be arranged in a passage of the milk conduit 160 having substantially the same diameter as the milk conduit 260, 260a, 260b. Thereby a pressure drop over the pressure sensor 270, 270a, 270b is avoided, or at least reduced.

The pressure sensor may for example measure the fluid pressure in the milk conduit at a frequency about 10-1000 Hz in some embodiments, preferably about 100-1000 measurements per second.

The sampling frequency of the pressure sensor may be predetermined or adjustable in different embodiments.

The more frequently the vacuum pressure level is measured by the respective pressure sensor 270, 270a, 270b, the more precise fine tuning of the applied vacuum pressure level could be made.

Each milking unit 140, 140a, 140b of the milking system 100 is also associated with a respective controllable valve arrangement 250, 250a, 250b. The controllable valve arrangement 250, 250a, 250b is arranged in the milk conduit 160 between the milking unit 140, 140a, 140b and the common milk line 130.

The controllable valve arrangement 250, 250a, 250b comprises an adjustable passage wherein fluid pressure of the common milk line 130 is provided to the milk conduit 260, 260a, 260b via the adjustable passage. An adjustment of the adjustable passage thereby results in an adjustment of the fluid pressure upstream the controllable valve arrangement 250, 250a, 250b in a liquid flow path.

The expression "upstream" and/or "downstream" in the current context refers to the liquid flow path, i.e. the milk flow during milk extraction in the milking session, or cleaning liquid flow during Cleaning In Place (CIP) cleaning; from the teat cups 241, 241a, 241b, 241c, via the milk conduit 260, 260a, 260b to the common milk line 130 and the receiver 220.

The controllable valve arrangement 250, 250a, 250b may be implemented in various distinct versions in different embodiments, for example as illustrated in Figured 2A-2B.

By regulating the adjustable passage in a controlled manner, the vacuum pressure level supplied to the milk conduit 260, 260a, 260b upstream the controllable valve arrangement 250, 250a, 250b is correspondingly adjusted.

Each milking unit 140, 140a, 140b of the milking system 100, and thereby also each milking point 120, 120a, 120b, 120c, 120d, 120e, 120f, is associated with a respective controller 280, 280a, 280b, or processing device. The controller 280, 280a, 280b is communicatively connected to the pressure sensor 270, 270a, 270b and to the controllable valve arrangement 250, 250a, 250b, for instance via a wireless connection based on radio or optical technique, or a wired connection implemented by electric cable or optic fiber.

The controller 280, 280a, 280b may comprise one or more instances of a processing circuit/circuitry, i.e. a Central Processing Unit (CPU), an Application Specific Integrated Circuit (ASIC), a microprocessor, a Graphics Processing Unit (GPU), an Electronic Control Unit (ECU), or other processing logic that may interpret and execute instructions. The herein utilized expression "processing circuitry" may thus represent a processing circuitry comprising a plurality of processing circuits, such as, e.g., any, some or all of the ones enumerated above.

The controller 280, 280a, 280b is configured to, repeatedly during the milking session, obtain pressure level measurements from the pressure sensor 270, 270a, 270b, and, based on the obtained pressure level measurement, generate and provide a control signal to the controllable valve arrangement 250, 250a, 250b, to adjust the adjustable passage. The control signal may for example comprise an electrical control signal.

The controller 280, 280a, 280b may obtain pressure level measurements from the pressure sensor 270, 270a, 270b for example 500-1000 times per second, in some implementations.

By adjusting the adjustable passage, the fluid pressure upstream the controllable valve arrangement 250, 250a, 250b in the liquid flow path is correspondingly adjusted.

The controller 280 may be configured to generate and provide the control signal to the controllable valve arrangement 250, 250a, 250b, 250c in order to maintain the fluid pressure upstream of the controllable valve arrangement 250, 250a, 250b, 250c in the liquid flow path substantially constant during the milking session, in some embodiments.

In other embodiments, controller 280 may be configured to generate and provide the control signal to the controllable valve arrangement 250, 250a, 250b, 250c in order to maintain the fluid pressure upstream of the controllable valve arrangement 250, 250a, 250b, 250c in the liquid flow path at distinct plurality of fluid pressure levels during the milking session, based on the obtained pressure level measurements.

The direction and/or size of the adjustment of the adjustable passage, i.e. increasing or decreasing/closing the passage may be determined by the controller 280, 280a, 280b in several distinct ways in different embodiments. For example, the controller 280, 280a, 280b may compare the obtained respective pressure level measurement with a desired vacuum pressure level; or alternatively a desired vacuum pressure interval.

Alternatively, the controller 280, 280a, 280b may compare the latest obtained respective pressure level measurement with one or several previously obtained pressure level measurements and calculate the size of the adjustment of the adjustable passage based on the size of the difference between the respective pressure level measurements, and/or the change rate of the difference between the pressure level measurements.

When the obtained pressure level measurement is lower (for example 38 kPa below atmospheric pressure) than the desired vacuum pressure level (for example 35 kPa below atmospheric pressure), the controller 280, 280a, 280b may generate and provide a control signal to the controllable valve arrangement 250, 250a, 250b to decrease the adjustable passage in order to provide an increased fluid pressure, i.e. less under-pressure, upstream the controllable valve arrangement 250, 250a, 250b in the liquid flow path.

Alternatively, when the obtained pressure level measurement is higher (for example 32 kPa below atmospheric pressure) than the desired vacuum pressure level (for example kPa below atmospheric pressure), the controller 280, 280a, 280b may generate and provide a control signal to the controllable valve arrangement 250, 250a, 250b to increase the adjustable passage in order to provide a decreased fluid pressure, i.e. more under-pressure, upstream the controllable valve arrangement 250, 250a, 250b in the liquid flow path.

Hereby, a substantially constant fluid pressure may be maintained in the milking unit 140, 140a, 140b, regardless of the current milk flow rate. It is thereby possible to apply a relatively high milking vacuum, i.e. relatively high under-pressure, yet assuring teat integrity by not exposing the animal teats for a too high under pressure.

In some embodiments, the controller 280, 280a, 280b may generate the control signal to the controllable valve arrangement 250, 250a, 250b based on a difference between the obtained pressure level measurement and one or several previously obtained pressure level measurements. In case the difference in pressure level measurements is large, the control signal may cause the controllable valve arrangement 250, 250a, 250b to adjust the adjustable passage with a larger step than in the opposite case.

Thus, the size of the adjustable passage may be proportional to a difference between the latest obtained pressure level measurement and the previously obtained pressure level measurement.

In the embodiment illustrated in FIG. 2A, the milking units 140, 140a, 140b of the milking system 100 comprises a claw 242, connected to each of the teat cups 241, 241a, 241b, 241c. One single milk conduit 260, 260a, 260b, 260c may be connected to the claw 242, for extracting milk from the teats of the animal to the common milk line 130. The single milk conduit 260, 260a, 260b, 260c comprises one pressure sensor 270, 270a, 270b and one controllable valve arrangement 250, 250a, 250b, controlled by one controller 280, 280a, 280b.

Figure 2B:
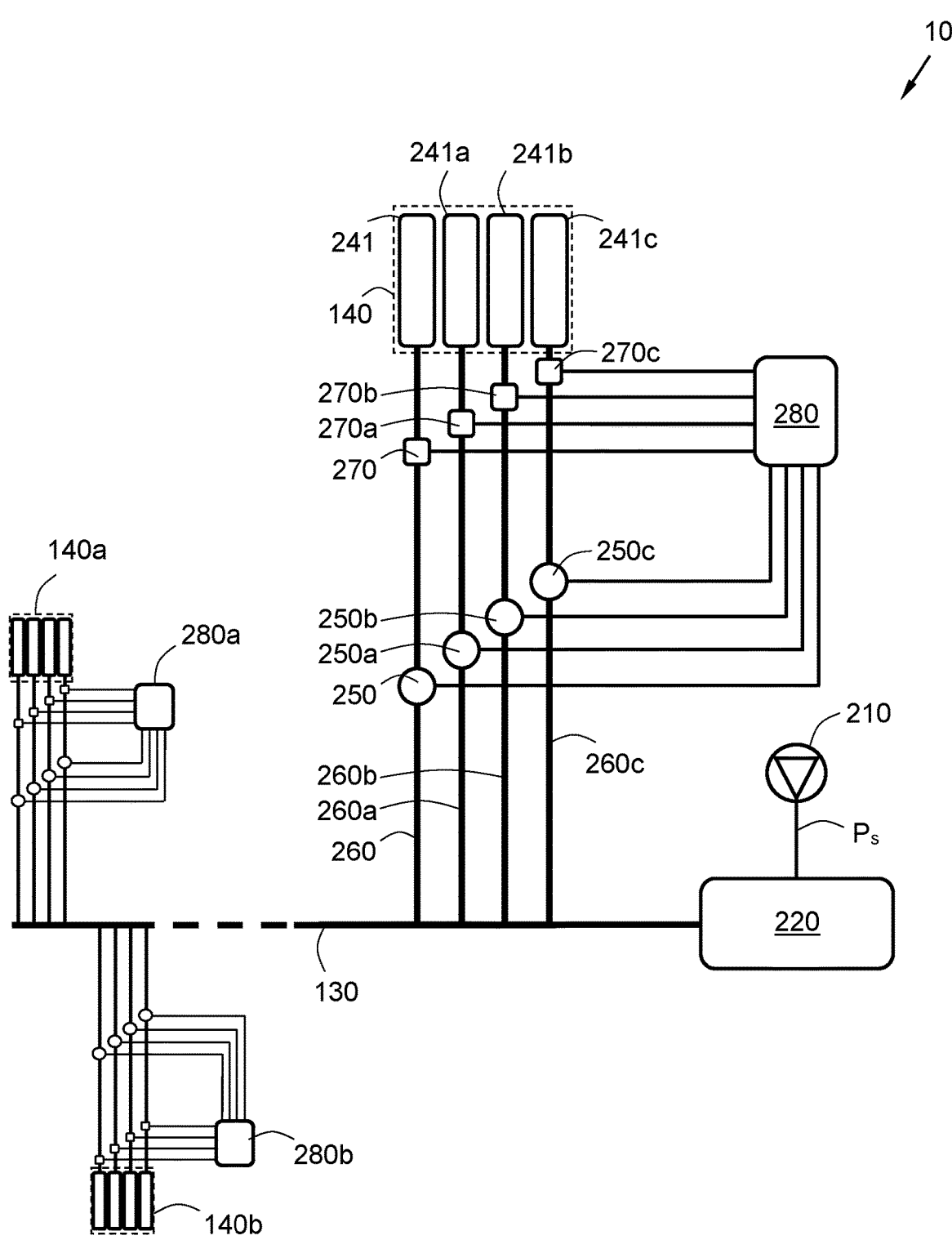
FIG. 2B illustrates a milking system according to an embodiment.

In the alternative embodiment illustrated in FIG. 2B, one milk conduit 260, 260a, 260b, 260c may be connected directly to each teat cup 241, 241a, 241b, 241c. Each milk conduit 260, 260a, 260b, 260c may comprise one pressure sensor 270, 270a, 270b, 270c, and one controllable valve arrangement 250, 250a, 250b, 250c. All controllable valve arrangements 250, 250a, 250b, 250c comprised in the respective milking unit 140, 140a, 140b may be controlled by one dedicated controller 280, 280a, 280b.

The controller 280, 280a, 280b may in some embodiments generate the control signal to the controllable valve arrangement 250, 250a, 250b, 250c based on a calculated rolling average of a number of obtained pressure level measurements. Hereby, random fluctuations of measurement values may be evened out.

The controller 280, 280a, 280b may also be configured to, when all pressure level measurements performed during a predetermined time period exceeds a maximum pressure threshold limit, to generate a command to output an alert on an output device, related to the milking unit 140, 140a, 140b, for example a computer or telephone device of the farmer, and/or to completely shut off vacuum supply of the milking unit 140, 140a, 140b. The reason may be a malfunction of the controllable valve arrangement 250, 250a, 250b, 250c or other component of the milking system 100. Thanks to this security measure, harm caused to the animal teats is avoided or reduced.

The alert may for example be output on a mobile telephone, computer, and/or a wearable electronic device of the farmer, such as an intelligent watch and/or intelligent glasses or similar device. The alert may also, or alternatively, be output on a loudspeaker and/or display arranged at the farm.

In embodiments of the milking system 100, the controller 280, 280a, 280b may be configured to apply a latency period before making any changes in the control signal provided to the controllable valve arrangement 250, 250a, 250b, 250c.

By applying the latency period, for example about some few seconds, a sudden spike in milk flow, or some singular/isolated fluid pressure measurements does not trigger an unnecessary adjustment of the controllable valve arrangement 250, 250a, 250b, 250c, unless a consistently increased/decreased milk flow is performed. Teat integrity is thereby additionally enhanced.

The controller 280, 280a, 280b is with general advantage configured to perform the above-described procedure in an automatic manner by executing a computer program. Therefore, according to some embodiment, the controller 280, 280a, 280b may comprise a memory unit, i.e., non-volatile data carrier, storing the computer program, which, in turn, may contain software for making a processing circuitry in the form of at least one processor in the controller 280, 280a, 280b to execute the above-described actions when the computer program is run on the processing circuitry.

The milking system 100 may in addition also comprise a database or data storage memory in some embodiments, communicatively connected to the controller 280, 280a, 280b. The optional database may be configured to store data, for example related to various desired fluid pressure levels, such as for example the desired fluid pressure level, the desired fluid pressure interval, previously obtained fluid pressure level measurements etc.

The database may in some embodiments comprise individual milk flow data, or vacuum profile, stored associated with a respective animal identity reference.

It hereby becomes possible to generate and provide the control signals adapted to the applied vacuum profile/milk flow rate of the individual animal 110, 110a, 110b, 110c, 110d, 110e, 110f during the milking session.

The controller 280, 280a, 280b may thereby be configured to obtain an identity reference of the animal 110, 110a, 110b, 110c, 110d, 110e, 110f at the milking point 120, 120a, 120b, 120c, 120d, 120e, 120f, before or at the beginning of the milking session. Based on the obtained identity reference, vacuum profile of the animal 110, 110a, 110b, 110c, 110d, 110e, 110f may be obtained from the database. The controller 280, 280a, 280b may then generate and provide the control signal to the controllable valve arrangement 250,

250a, 250b, 250c in order to follow the obtained vacuum profile during the milking session of the animal 110, 110a, 110b, 110c, 110d, 110e, 110f.

The identification of the animal 110, 110a, 110b, 110c, 110d, 110e, 110f may be made by an animal identification sensor such as for example a camera that in conjunction with an image recognition program of the controller 280, 280a, 280b may identify the animal 110, 110a, 110b, 110c, 110d, 110e, 110f, based on an animal-unique skin pattern and/or visual markings made on the animal 110, 110a, 110b, 110c, 110d, 110e, 110f such as an animal-unique ID number on an ear tag, an ID number (or other animal-unique marking) on the hide, a bar code comprising the ID number.

Alternatively, in other embodiments, the animal identifying sensor may be based on a short distance radio wave communication. The identification of the animal 110, 110a, 110b, 110c, 110d, 110e, 110f may then be made by the animal identifying sensor in form of a reader or transceiver, obtaining a signal from a Radio-Frequency Identification (RFID) tag associated with the animal 110, 110a, 110b, 110c, 110d, 110e, 110f, for example attached to an ear of the animal 110, 110a, 110b, 110c, 110d, 110e, 110f, carried in a neck lace around the neck of the animal 110, 110a, 110b, 110c, 110d, 110e, 110f, injected under the skin of the animal 110, 110a, 110b, 110c, 110d, 110e, 110f, etc. Instead of RFID, the signaling may be based on Bluetooth, Wi-Fi, Near-Field Communication (NFC), etc.

The signal emitting tag may comprise electronically stored information for uniquely (at least uniquely within the farm) identifying the animal 110, 110a, 110b, 110c, 110d, 110e, 110f.

The animal identifying sensor may then provide the sensor detection data of the animal 110, 110a, 110b, 110c, 110d, 110e, 110f, to the controller 280, over a wired or wireless communication interface.

The optional database/memory may comprise a physical device of integrated circuits comprising silicon-based transistors.

The milking session of the animal 110, 110a, 110b, 110c, 110d, 110e, 110f may be regarded as beginning when the first teat cup 241, 241a, 241b, 241c is attached to the first teat, and/or when milk flow of the animal 110, 110a, 110b, 110c, 110d, 110e, 110f is firstly detected; and/or when pre-treatment is performed on the first teat of the animal 110, 110a, 110b, 110c, 110d, 110e, 110f.

Figure 3A:
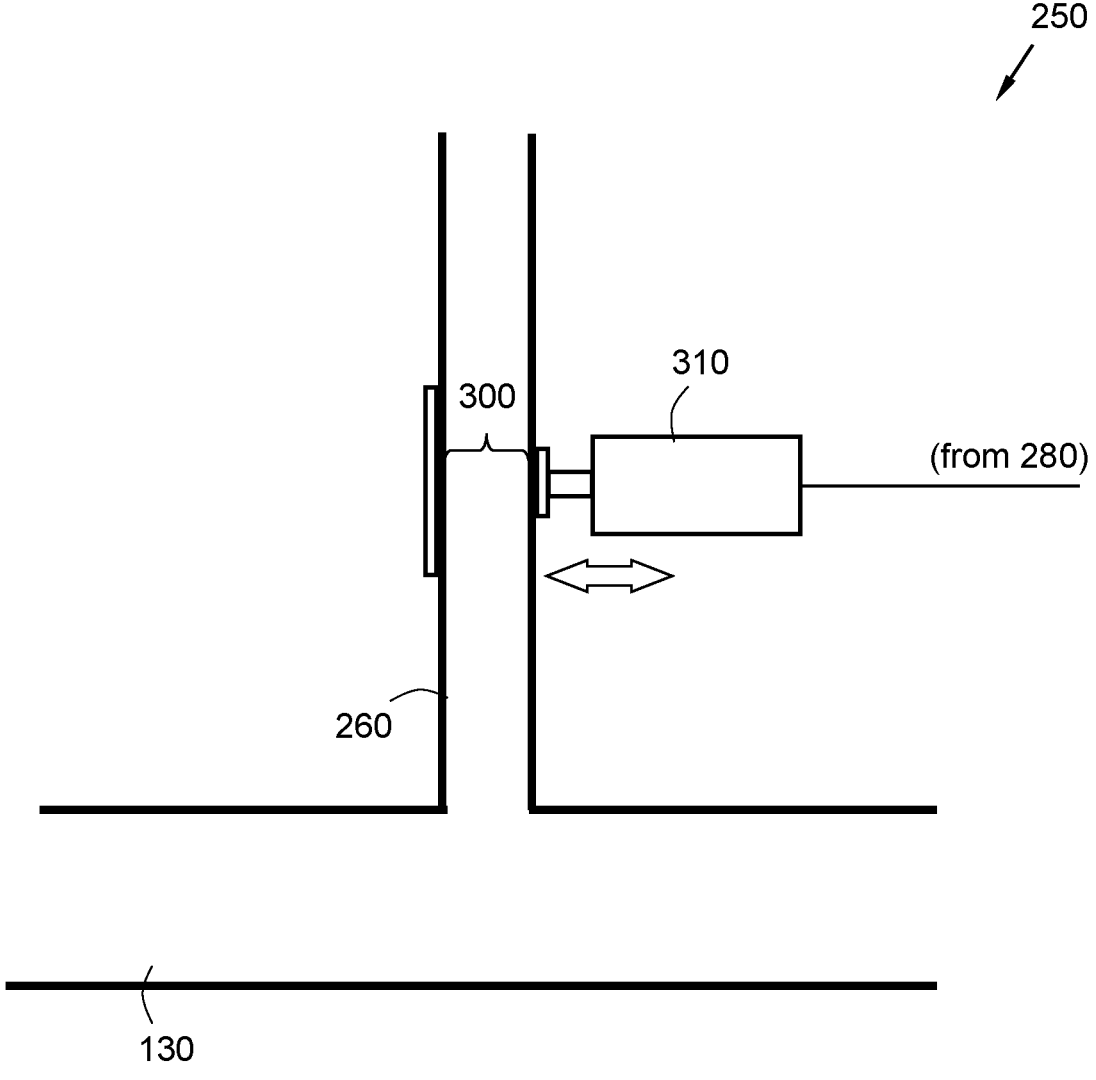
FIG. 3A conceptually illustrates a controllable valve arrangement and other parts of the milking system according to an embodiment.

FIG. 3A schematically illustrates an embodiment of a controllable valve arrangement 250.

The controllable valve arrangement 250 comprises an actuator 310 arranged to receive the control signal from the controller 280. The actuator 310 may comprise a cylinder driven by an electrical motor or similar device and a first and a second plate. The milk conduit 260 is comprised between the first plate and the second plate. The cylinder acts on one of the first plate, or the second plate, thereby adjusting the adjustable passage 300 of the milk conduit 260 based on the received control signals of the controller 280 by adjusting the position of the plate in relation to the other plate.

In the illustration of FIG. 3A, the adjustable passage 300 is opened up to a maximum. The actuator 310 may reduce the adjustable passage 300 by pressing on the outside of the milk conduit 260 by a cylinder, as directed by the control signal of the controller 280.

Figure 3B:
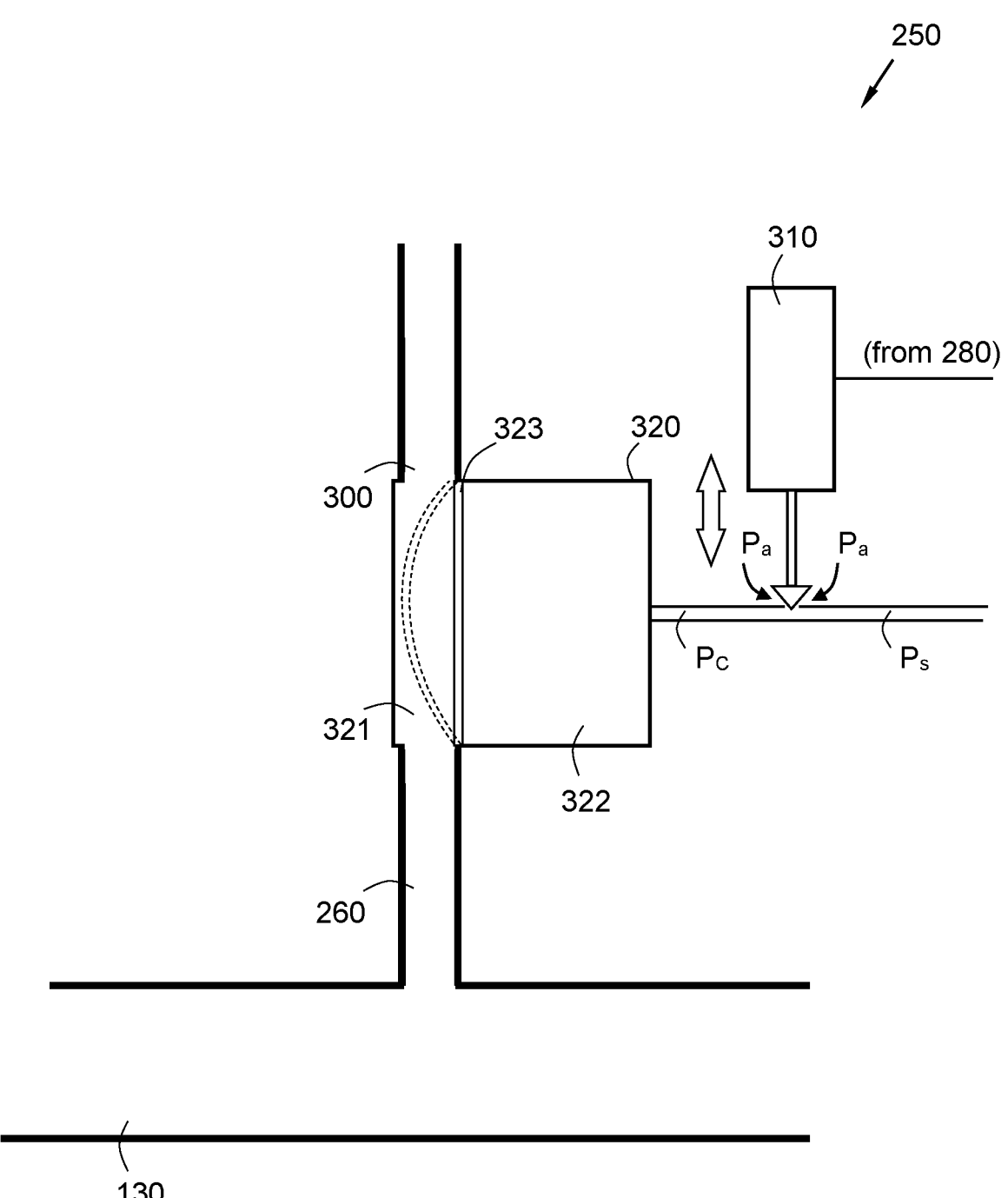
FIG. 3B conceptually illustrates a controllable valve arrangement and other parts of the milking system according to an embodiment.

FIG. 3B schematically illustrates yet an embodiment of a controllable valve arrangement 250. The controllable valve arrangement 250 may comprise an actuator 310, such as for example a solenoid, and an air valve. The controllable valve arrangement 250 may also comprise a valve 320, such as a shut-off valve or other similar valve arrangement.

The valve 320 comprises a wet section 321 and a dry section 322, separated by a flexible membrane 323. The milk conduit 260 passes the wet section 321 via the adjustable passage 300. The flexible membrane 323 is configured to close the adjustable passage 300 of the milk conduit 260 when atmospheric air pressure is provided to the dry section 322 and to open the adjustable passage 300 when a control vacuum $P_c$ at a large under-pressure is provided to the dry section 322.

A control vacuum $P_c$ is generated by mixing the system vacuum pressure $P_s$ with atmospheric air pressure $P_a$.

The actuator 310 may comprise a regulator block connected to the vacuum pump 210 and consequently the system vacuum $P_s$. Moreover, the regulator block is connected to atmospheric air pressure $P_a$ via the air valve that is connected to the solenoid.

By controlling the solenoid, the air valve may open to atmospheric air pressure $P_a$ and the solenoid may be controlled such that the frequency with which the air valve is opened regulates the inlet of air and consequently the mixture of atmospheric air pressure $P_a$ and system vacuum pressure $P_s$ for generating the control vacuum $P_c$ at a desired level.

The actuator 310 is arranged to receive the control signal from the controller 280. Based on the received control signal, the actuator 310 may adjust the level of control vacuum $P_c$ provided to the valve 320 by increasing/reducing the opening of the air valve for adjusting the amount of inlet atmospheric air pressure $P_a$. The control vacuum $P_c$ is provided to the valve 320, wherein the valve 320 is arranged to adjust the adjustable passage 300 according to the provided control vacuum $P_c$.

By regulating the adjustable passage 300 in a controlled manner, the fluid pressure level supplied to the milk conduit 260 upstream the controllable valve arrangement 250 is correspondingly adjusted.

The vacuum pressure level provided to the milk conduit 260 upstream controllable valve arrangement 250 in the liquid flow path may thus be adjusted via the adjustable passage 300. A control vacuum level provided to the dry section 322 may adjust the size of the adjustable passage 300 by acting on the flexible membrane 323, which in turn adjusts the passage 300, thereby causing a controllable drop in pressure when the control vacuum $P_c$ provided to the dry section 322 of the controllable valve 320 is decreased.

The control vacuum level or the pressure provided to the dry section 322 of the controllable valve 320 may sometimes also be referred to as pilot vacuum level.

The pilot vacuum level provided to the controllable valve 320 may be monitored during a milking session in some embodiments, i.e. the vacuum level of the dry section 322 of the controllable valve 320 may be monitored/repeatedly measured during the milking session, for example by the pressure sensor 270, 270a, 270b may be arranged for example in the dry section 322 of the controllable valve 320.

The provided control vacuum $P_c$ acts on the flexible membrane 323. The adjustable passage 300 is thereby increased as the flexible membrane 323 opens up the passage 300. When the actuator 310 receives control signals from the controller 280 to decrease the adjustable passage 300, more atmospheric pressure $P_a$ is inlet to the control vacuum $P_c$ thereby increasing (i.e. less under-pressure) the pressure level of the control vacuum $P_c$. The increased control vacuum $P_c$ is then provided to the dry section 322, thereby causing the flexible membrane 323 to collapse by the atmospheric pressure, which closes the adjustable passage 300.

The control signaling of the controller 280, 280a, 280b may comprise Pulse Width Modulation (PWM) signals provided to the actuator 310. The solenoid of the actuator 310 may then cause the regulator block to open/close the air valve which adjusts the inlet of atmospheric air pressure $P_a$ based on the PWM signals. The pressure level of the control vacuum $P_c$ provided to the controllable valve 320 is thereby adjusted according to the received control signals.

Figure 3C:
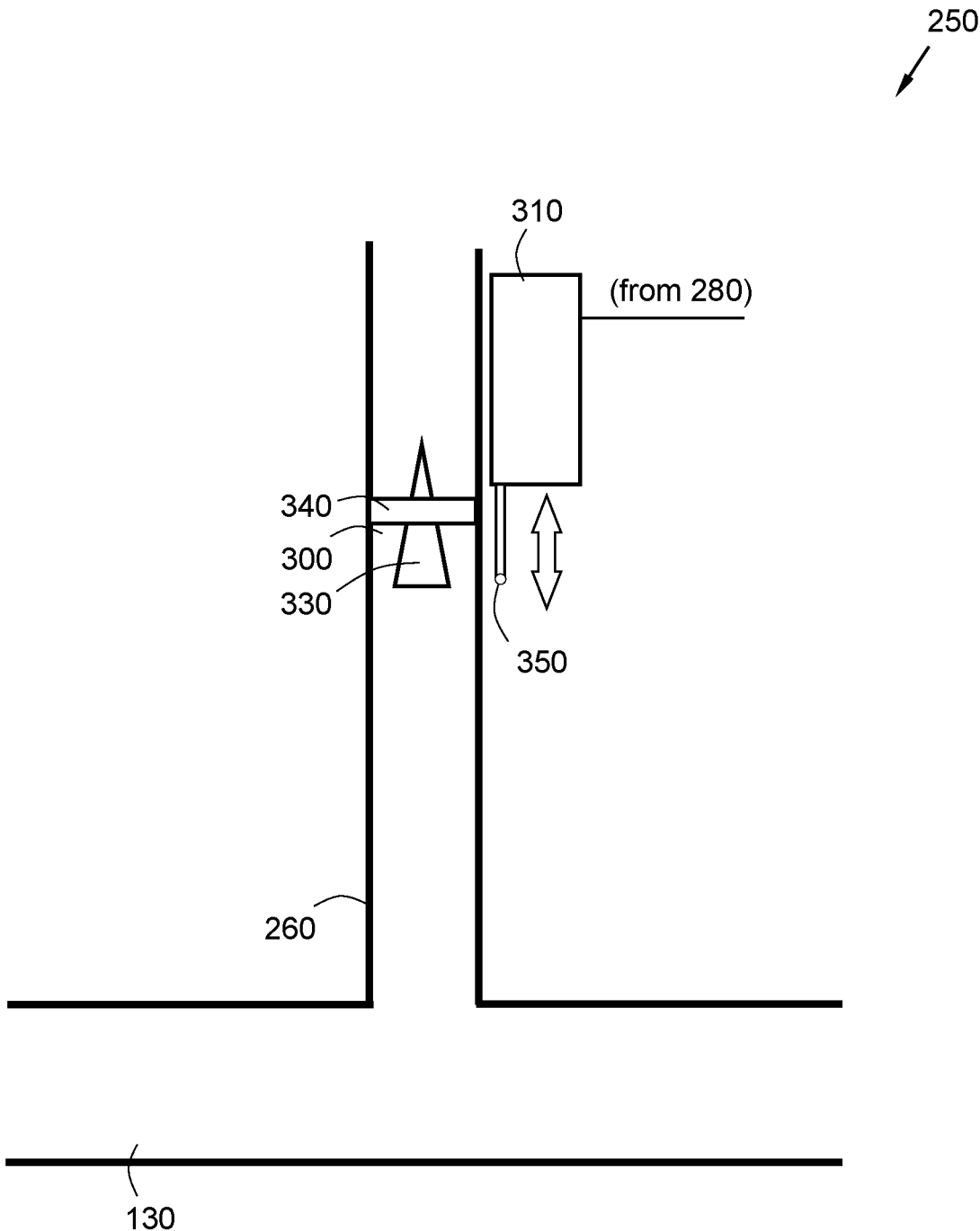
FIG. 3C conceptually illustrates a controllable valve arrangement and other parts of the milking system according to an embodiment.

FIG. 3C schematically illustrates yet an embodiment of a controllable valve arrangement 250, wherein the controllable valve arrangement 250 comprises a moveable magnetic male part 330 and also a non-moveable female part 340, inside the milk conduit 260. The moveable magnetic male part 330 may be arranged to interact with the non-moveable female part 340.

A longitudinal distance between the moveable magnetic male part 330 and the non-moveable female part 340 may form the adjustable passage 300, which adjustable passage 300 may be adjusted by altering a longitudinal position of the moveable magnetic male part 330 in relation to the non-moveable female part 340.

The actuator 310 may be arranged to receive the electrical control signal from the controller 280 and, based on the received electrical control signal, adjust position of a magnetic segment 350 of the actuator 310 acting on the moveable magnetic male part 330, thereby altering the longitudinal position of the moveable magnetic male part 330, which position adjusts the adjustable passage 300.

The vacuum pressure sensor 270 is arranged to measure the pressure level in the milk conduit 260 upstream the controllable valve 250 in the liquid flow path. The controller 280, which may be communicatively connected to the vacuum pressure sensor 270, may be configured to obtain a sequence of pressure level measurements from the vacuum pressure sensor 270 during a predetermined time period. Also, the controller 280 may be configured to compare the obtained pressure level measurement with a previously obtained pressure level measurement.

The controller 280 may be configured to generate and provide a control signal to the controllable valve arrangement 250 to close the adjustable passage 300 when a difference between the respective obtained pressure levels exceeds a kick-off detection pressure difference.

It is thereby immediately detected that one or several teat cups 241, 241a, 241b, 241c has slipped off/fallen off the animal teats and the adjustable passage 300 is immediately closed, preferably before the teat cup/s 241, 241a, 241b, 241c reaches the floor, which improves food safety.

Thanks to the disclosed concept, a methodology has been developed towards an efficient milk extraction by ensuring a stable fluid pressure level under the teats, yet conserving teat integrity.

The terminology used in the description of the embodiments as illustrated in the accompanying drawings is not intended to be limiting of the described milking system 100; controller 280 and/or computer program. Various changes, substitutions and/or alterations may be made, without departing from invention embodiments as defined by the appended claims.

The various illustrated embodiments depicted in FIGS. 1A-3C, and/or discussed in the corresponding respective section of the description may with advantage be combined with each other, for example by mixing and compiling features of some or all of the described embodiments, thereby achieving additional advantages.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g., a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage.

The invention claimed is:

1. A milking system (100) configured to milk several animals (110, 110a, 110b, 110c, 110d, 110e, 110f) simultaneously, comprising:
   a vacuum pump (210), configured to generate a system vacuum pressure (Ps);
   a receiver (220), connected to the vacuum pump (210);
   a common milk line (130), connected to the receiver (220);
   a plurality of milking points (120, 120a, 120b, 120c, 120d, 120e, 120f), each milking point configured to house one of the animals (110, 110a, 110b, 110c, 110d, 110e, 110f) at the time during a milking session; wherein each of the milking points (120, 120a, 120b, 120c, 120d, 120e, 120f) includes:
   a milking unit (140, 140a, 140b), said milking unit comprising at least one teat cup (241, 241a, 241b, 241c), which is/are configured to fit on a respective teat of the animal (110, 110a, 110b, 110c, 110d, 110e, 110f) during the milking session; wherein said milking unit (140, 140a, 140b) is connected to the common milk line (130) via a respective milk conduit (260, 260a, 260b, 260c); and wherein said milking unit (140, 140a, 140b) is associated with
   a controllable valve arrangement (250, 250a, 250b, 250c), arranged in the milk conduit (260, 260a, 260b, 260c) between the milking unit (140, 140a, 140b) and the common milk line (130), wherein the controllable valve arrangement (250, 250a, 250b, 250c) comprises an adjustable passage (300) wherein fluid pressure of the common milk line (130) is provided to the milk conduit (260, 260a, 260b, 260c) via the adjustable passage (300); and wherein an adjustment of the adjustable passage (300) results in an adjustment of the fluid pressure in the milking unit (140, 140a, 140b) and in a section of the milk conduit (260, 260a, 260b, 260c) between the milking unit (140, 140a, 140b) and the controllable valve arrangement (250, 250a, 250b, 250c) upstream of the controllable valve arrangement (250, 250a, 250b, 250c) in a liquid flow path;
   a pressure sensor (270, 270a, 270b, 270c), arranged to measure fluid pressure in the section of the milk conduit (260, 260a, 260b, 260c) between the milking unit (140, 140*a*, 140*b*) and the controllable valve arrangement (250, 250*a*, 250*b*, 250*c*);

a controller (280) communicatively connected to the pressure sensor (270, 270*a*, 270*b*, 270*c*) and to the controllable valve arrangement (250, 250*a*, 250*b*, 250*c*), wherein the controller (280) is configured to, repeatedly during the milking session:

obtain a pressure level measurement from the pressure sensor (270, 270*a*, 270*b*, 270*c*); and generate and provide a control signal to the controllable valve arrangement (250, 250*a*, 250*b*, 250*c*), to adjust the adjustable passage (300) in order to maintain the fluid pressure upstream of the controllable valve arrangement (250, 250*a*, 250*b*, 2050*c*) in the liquid path at a plurality of distinct fluid pressure levels during the milking session, based on the obtained pressure level measurement, wherein the controller is further configured to compare a most recent obtained respective pressure level measurement with one or several previously obtained said pressure level measurements and calculate a size of the adjustment of the adjustable passage based on the change rate of the difference between the pressure level measurements.

2. The milking system (100) according to claim 1, wherein the milking unit (140, 140*a*, 140*b*) comprises a plurality of the teat cups (241, 241*a*, 241*b*, 241*c*) and a claw (242), the claw (242) being connected to each of the teat cups (241, 241*a*, 241*b*, 241*c*); and wherein the milk conduit (260, 260*a*, 260*b*, 260*c*) is connected to the claw (242).

3. The milking system (100) according to claim 1, wherein the controller (280) is configured to obtain an identity reference of the animal (110, 110*a*, 110*b*, 110*c*, 110*d*, 110*e*, 110*f*) situated in the milking point (120, 120*a*, 120*b*, 120*c*, 120*d*, 120*e*, 120*f*), before or at the beginning of the milking session;

obtain a vacuum profile of the animal (110, 110*a*, 110*b*, 110*c*, 110*d*, 110*e*, 110*f*), based on the obtained identity reference; and generate and provide the control signal to the controllable valve arrangement (250, 250*a*, 250*b*, 250*c*) in order to follow the obtained vacuum profile during the milking session of the animal (110, 110*a*, 110*b*, 110*c*, 110*d*, 110*e*, 110*f*).

4. The milking system (100) according to claim 3, wherein the pressure sensor (270, 270*a*, 270*b*, 270*c*) is arranged in a section of the milk conduit (260, 260*a*, 260*b*, 260*c*) in close vicinity of the milking unit (140, 140*a*, 140*b*), but not integrated in the milking unit (140, 140*a*, 140*b*).

5. The milking system (100) according to claim 4, wherein the pressure sensor (270, 270*a*, 270*b*, 270*c*) is arranged in a passage of the milk conduit (260, 260*a*, 260*b*, 260*c*) having substantially the same diameter as the milk conduit (260, 260*a*, 260*b*, 260*c*).

6. The milking system (100) according to claim 5, wherein the controllable valve arrangement (250, 250*a*, 250*b*, 250*c*) comprises an actuator (310) arranged to receive the control signal from the controller (280) and adjust the adjustable passage (300) of the milk conduit (260, 260*a*, 260*b*, 260*c*), based on the received control signal.

7. The milking system (100) according to claim 6, wherein the controllable valve arrangement (250, 250*a*, 250*b*, 250*c*) also comprises a valve (320), the valve (320)

comprising a wet section (321) and a dry section (322), separated by a flexible membrane (323), wherein the milk conduit (260, 260*a*, 260*b*, 260*c*) passes the wet section (321), and wherein the flexible membrane (323) is configured to close the adjustable passage (300) of the milk conduit (260, 260*a*, 260*b*, 260*c*) when atmospheric air pressure is provided to the dry section (322) and to open the adjustable passage (300) when control vacuum is provided to the dry section (322); and wherein the actuator (310) is arranged to receive the control signal from the controller (280) and, based on the received control signal, adjust a level of the control vacuum provided to the dry section (322) of the valve (320); and wherein the valve (320) is arranged to adjust the adjustable passage (300) according to the provided control vacuum.

8. The milking system (100) according to claim 6, wherein the controllable valve arrangement (250, 250*a*, 250*b*, 250*c*) comprises a moveable magnetic male part (330) arranged inside the milk conduit (260, 260*a*, 260*b*, 260*c*), wherein the moveable magnetic male part (330) is arranged to interact with a non-moveable female part (340) in the milk conduit (260, 260*a*, 260*b*, 260*c*); and wherein a longitudinal distance between the moveable magnetic male part (330) and the non-moveable female part (340) forms the adjustable passage (300), wherein said adjustable passage (300) is adjusted by altering a longitudinal position of the moveable magnetic male part (330) in relation to the non-moveable female part (340); and wherein the actuator (310) is arranged to receive the electrical control signal from the controller (280) and, based on the received electrical control signal, adjust position of a magnetic segment (350) of the actuator (310) acting on the moveable magnetic male part (330), thereby altering the longitudinal position of the moveable magnetic male part (330), which position adjusts the adjustable passage (300).

9. The milking system (100) according to claim 8, wherein the controller (280) is configured to, repeatedly during the milking session:

compare the obtained pressure level measurement with a previously obtained pressure level measurement; and, when a difference between the respective pressure levels exceeds a kick-off detection pressure difference:

generate and provide the control signal to the controllable valve arrangement (250, 250*a*, 250*b*, 250*c*) to close the adjustable passage (300).

10. The milking system (100) according to claim 9, wherein the milking system (100) comprises a milking parlor (101).

11. The milking system (100) according to claim 9, wherein the milking system (100) comprises a rotary platform (102).

12. The milking system of claim 1, wherein the controller (280, 280*a*, 280*b*) is configured to apply a latency period before making any changes in the control signal provided to the controllable valve arrangement (250, 250*a*, 250*b*, 250*c*).

13. The milking system of claim 1, wherein the controller is configured to calculate the size of the adjustment of the adjustable passage based on the size of the difference between the respective measurements.

\* \* \* \* \*